(No Model.)
L. A. BRINGIER.
TAIL BOARD FOR WAGONS.
No. 252,996. Patented Jan. 31, 1882.
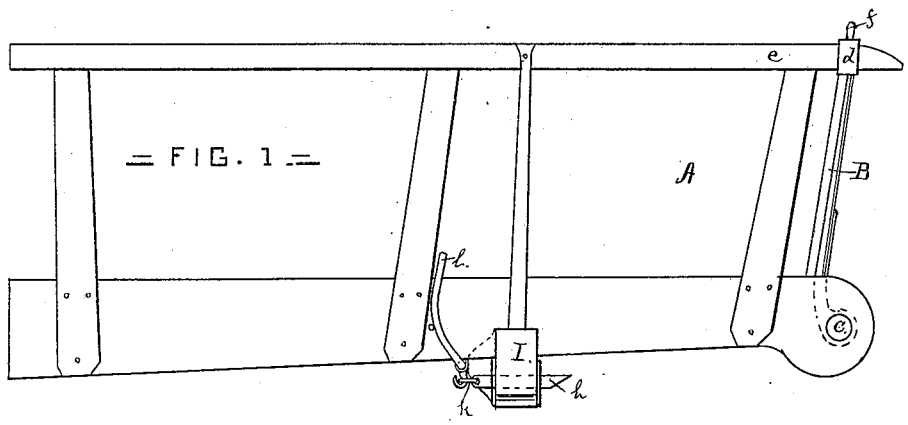
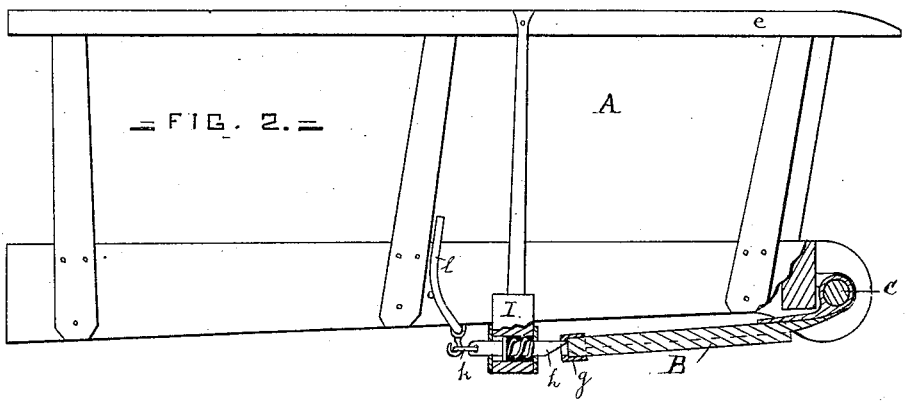
WITNESSES.
J. C. Hubbell
P. J. Finney.
INVENTOR.
L. A. Bringier
BY H. N. Jenkins
ATTORNEY

UNITED STATES PATENT OFFICE.

LOUIS A. BRINGIER, OF DONALDSONVILLE, LOUISIANA.

TAIL-BOARD FOR WAGONS.

SPECIFICATION forming part of Letters Patent No. 252,996, dated January 31, 1882.

Application filed May 24, 1881. (No model.)

*To all whom it may concern:*

Be it known that I, LOUIS A. BRINGIER, a resident of the town of Donaldsonville, parish of Ascension, and State of Louisiana, have invented a certain new and useful Improvement in Tail-Boards for Wagons; and I do hereby declare the following to be a full, clear, and correct description of the same, reference being had to the annexed drawings, making a part of this specification.

This invention is applicable to all kinds of tilting wagons and carts; but it is more especially intended for the wagons and carts used in cane districts for the transportation of sugar-canes. Its object is to render the unloading of wagons and carts more expeditious and less laborious than heretofore.

In order to fully understand the nature of my invention, reference must be had to the accompanying drawings, whereon—

Figures 1 and 2 represent side elevations of the body of an ordinary cane-cart provided with my improvement. In the latter figure parts of the cart-body are broken away to show my improvements in section.

A is the body of the cart, and B the tail-board thereof, the latter connected with the former by means of hinges or pivots $c$, so as to be swung into either of the positions shown. The two outer corners of the tail-board are provided with straps or eyes $d$, which slip over the projecting ends of the top pieces, $e$, of the cart-body, and in which pins $f$ are inserted for holding the tail-board in a closed position, as shown at Fig. 1. In order to hold the tail-board in an open position its outer edge is provided with a socket, $g$, which, when brought in contact with a spring-catch, $h$, is engaged thereby, as shown at Fig. 2. The aforesaid catch is fitted in the axle I, and has its rear end connected by means of a link with the crank $k$ of a rock-shaft, the outer end of which is bent at about a right angle to the main portion thereof, so as to serve as a lever or handle, $l$, whereby the catch is withdrawn from its socket and the tail-board released.

From the above description it will be observed that in order to secure the tail-board in its open position it is only necessary to withdraw the pins $f$ and to swing the said board under the cart, when it secures itself.

Having described my invention, what I claim as new, and desire to secure by Letters Patent, is—

1. In a wagon or cart, the combination of a hinged or pivoted tail-board and a spring-catch, for the purpose of retaining the tail-board in an open position under the said wagon or cart, substantially as described, and for the purpose stated.

2. In a wagon or cart, the combination of a pivoted tail-board, a spring bolt-catch, and actuating-lever, arranged substantially as described, and for the purpose set forth.

3. In combination with the pivoted or hinged tail-board B, provided with socket $g$ at its outer end and the spring-catch $h$ to engage with the same, the axle I, formed with a recess or mortise, within which is located and operates the spring-catch, substantially as described.

In testimony whereof I have hereunto signed my name.

L. A. BRINGIER.

In presence of—
   N. B. TRIST,
   A. DEMAREST.